(12) United States Patent
Andersson et al.

(10) Patent No.: US 12,425,660 B2
(45) Date of Patent: Sep. 23, 2025

(54) COMBINING DEBLOCK FILTERING AND ANOTHER FILTERING FOR VIDEO ENCODING AND/OR DECODING

(71) Applicant: Telefonaktiebolaget LM Ericsson (publ), Stockholm (SE)

(72) Inventors: Kenneth Andersson, Gävle (SE); Jacob Ström, Stockholm (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/699,229

(22) PCT Filed: Aug. 24, 2022

(86) PCT No.: PCT/SE2022/050761
§ 371 (c)(1),
(2) Date: Apr. 5, 2024

(87) PCT Pub. No.: WO2023/059235
PCT Pub. Date: Apr. 13, 2023

(65) Prior Publication Data
US 2024/0414379 A1    Dec. 12, 2024

Related U.S. Application Data

(60) Provisional application No. 63/253,880, filed on Oct. 8, 2021.

(51) Int. Cl.
*H04N 19/82* (2014.01)
*H04N 19/86* (2014.01)

(52) U.S. Cl.
CPC .............. *H04N 19/82* (2014.11); *H04N 19/86* (2014.11)

(58) Field of Classification Search
CPC ............................... H04N 19/82; H04N 19/86
(Continued)

(56) References Cited

U.S. PATENT DOCUMENTS

| 12,177,491 B2 * | 12/2024 | Wan ........................ H04N 19/59 |
| 2015/0264406 A1 | 9/2015 | Kim et al. |

(Continued)

FOREIGN PATENT DOCUMENTS

| EP | 3 525 461 A1 | 8/2019 |
| WO | 2020177133 A1 | 9/2020 |
| WO | 2021170901 A1 | 9/2021 |

OTHER PUBLICATIONS

Kawamura, K. et al., "CE13-related: Adaptive CNN based in-loop filtering with boundary weights", Joint Video 1 Experts Team (JVET) of ITU-T SG 16 WP3 and ISO/IEC JTC 1/SC 29/WG 11, Document: JVET-N0712, 14th Meeting: Geneva, CH, Mar. 19-27, 2019 (2 pages).

(Continued)

*Primary Examiner* — Amir Shahnami
(74) *Attorney, Agent, or Firm* — Rothwell, Figg, Ernst & Manbeck, P.C.

(57) ABSTRACT

There is provided a method. The method comprises obtaining an input video frame data associated with an input video frame. The method comprises performing a deblocking filtering operation on one or more samples included in the input video frame, thereby generating one or more deblocked samples. The method further comprises performing a machine-learning (ML)-based filtering operation and/or adaptive loop filtering operation on one or more samples included in the input video frame, thereby generating one or more filtered samples. The method comprises, using said one or more deblocked samples and/or said one or more (Continued)

filtered samples, producing encoded or decoded video frame data including an encoded or decoded video frame.

19 Claims, 7 Drawing Sheets

(58) Field of Classification Search
USPC .................................................. 375/240.16
See application file for complete search history.

(56) References Cited

U.S. PATENT DOCUMENTS

| 2018/0184123 | A1 | 6/2018 | Terada et al. | |
|---|---|---|---|---|
| 2019/0230353 | A1 | 7/2019 | Gadde et al. | |
| 2019/0273948 | A1 | 9/2019 | Yin et al. | |
| 2020/0120340 | A1 | 4/2020 | Park et al. | |
| 2023/0110503 | A1* | 4/2023 | Lainema ................ | H04N 19/42 375/240.24 |

OTHER PUBLICATIONS

International Search Report and Written Opinion dated Sep. 23, 2022 in International Application No. PCT/SE2022/050761 (14 pages).
International Preliminary Report on Patentability and Written Opinion dated Apr. 9, 2024 in International Application No. PCT/SE2022/050761 (10 pages).
Andersson, K. et al., "EE1-related: Combination of VVC deblocking and NN loop filtering", Document: JVET-Y0098-v2, Joint Video Experts Team (JVET) of ITU-T S 16 WP 3 and ISO/IEC JTC 1/SC 29, 25th Meeting, by teleconference, Jan. 12-21, 2022 (4 pages).
Li, Y. et al., "EE1-1.6: Combined Test of EE1-1.2 and EE1-1.4", Document: JVET-X0066-v1, Joint Video Experts Team (JVET) of ITU-T SG 16 WP 3 and ISO/IEC JTC 1/SC 29, 24th Meeting, by teleconference, Oct. 6-15, 2021 (5 pages).
Wang, H. et al., "EE1-1.4: Tests on Neural Network-based In-Loop Filter with Constrained Computational Complexity", Document: JVET-X0140-v1, Joint Video Experts Team (JVET) of ITU-T SG 16 WP 3 and ISO/IEC JTC 1/SC 29, 24th Meeting, by teleconference, Oct. 6-15, 2021 (5 pages).

* cited by examiner

COMBINING DEBLOCK FILTERING AND ANOTHER FILTERING FOR VIDEO ENCODING AND/OR DECODING

CROSS REFERENCE TO RELATED APPLICATIONS

This application is a 35 U.S.C. § 371 National Stage of International Patent Application No. PCT/SE2022/050761, filed 2022 Aug. 24, which claims priority to U.S. Provisional Patent Application No. 63/253,880, filed 2021 Oct. 8. The above identified applications are incorporated by this reference.

TECHNICAL FIELD

This disclosure relates to methods and apparatus for combining deblock filtering and another filtering for video encoding and/or decoding.

BACKGROUND

A video sequence consists of a series of images where each image consists of one or more components. In this disclosure, the terms "images," "pictures," or "frames" are interchangeably used. Each component can be described as a two-dimensional rectangular array of samples having values. It is common that an image in a video sequence consists of three components: one luma component Y of which the sample values are luma values and two chroma components Cb and Cr of which the sample values are chroma values. Other examples include Y' Cb Cr, Yuv, and ICtCt.

In ICtCt, I is the "intensity luma" component. For the remainder of this disclosure, any luma component Y', Y, or I as Y or simply luma. It is common that the dimensions of the chroma components are smaller than the luma components by a factor of two in each dimension. For example, the size of the luma component of an HD image would be 1920×1080 and each of the chroma components would have the dimension of 960×540. The components are sometimes referred to as color components.

A "block" is a two-dimensional array of samples. In video coding, each component is split into one or more blocks and the coded video bitstream is a series of blocks. It is common in video coding that an image is split into units that cover a specific area of the image. Each unit consist of all blocks from all components that make up that specific area and each block belongs fully to one unit. The macroblock in H.264 and the Coding unit (CU) in High Efficiency Video Coding (HEVC) are examples of units.

In HEVC, each image is partitioned into coding tree units (CTU). A CTU consist of an N×N block of luma samples and two M×M corresponding chroma blocks. A CTU in HEVC is like macroblocks in H.264 and earlier standards but in contrast to macroblocks, the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees—the prediction tree that has prediction units (PUs) as nodes and the transform tree that has transform units (TUs) as nodes.

While some decoding processes in HEVC are done on the CU level, some are done on the PU level and some on TU level. Boundaries between PUs and boundaries between TUs are filtered by a deblocking filter to reduce discontinuities between TUs and PUs. In HEVC, there exist two kinds of prediction types for a PU—intra prediction which only uses prediction from previously decoded samples of the current image for prediction and inter prediction which uses prediction form at least one previously decoded image.

Deblocking is used to remove discontinuities between block boundaries and have been included in all recent standards (H.263, H.264, H.265/HEVC and H.266/VVC). The deblocking smooths out the discontinuities by filtering across vertical and horizontal boundaries. The effect of deblocking is mostly subjective but can also achieve rate savings. In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each 4 sample part of the boundary. If the value of bs is larger than 0, then deblocking may be applied. The larger the boundary strength is, the stronger filtering is applied. First it is checked if any of the blocks at a PU boundary between the blocks is an intra predicted block then (bs is set to=2), or if both blocks use inter prediction but they use different reference frames or have significantly different motion vectors then (bs is set to =1). It is also checked if a TU boundary between the blocks has non-zero transform coefficients in at least one of the blocks (code block flag CBF equal to 1), then (bs is set to =1).

This first check sets a boundary strength (bs) which is larger than 0 to indicate that deblocking should be applied for a 4 sample part of the boundary. The larger the boundary strength is, the stronger filtering is applied.

To reduce and/or avoid removing natural structures when deblocking, a check that there are not any natural structures on respective sides of the boundary is then applied for luma. In HEVC, gradient calculations are used on respective sides of the boundary using the following inequality: $abs(p0-2*p1+p2)+abs(q0-2*q1+q2)<beta$, where beta (also denoted "β") is a parameter based on the quantization parameter for the block and p0, p1, and p2 are samples on one side of the block boundary and q0, q1, to q2 are samples on the other side of the block boundary.

The condition is checked at two lines across of the 4 sample part of the boundary, line 0 and 3, and if both conditions are fulfilled, then the luma samples are deblocked for that 4 sample part of the boundary. This is applied for all 4 sample parts of a boundary until all samples of the block boundary have been checked and possibly filtered. Chroma boundaries may always be filtered if one any of the neighboring blocks are intra coded.

In the specification for VVC, a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree or transform tree as in HEVC. However, a CU in VVC can be divided into a multiple of TUs or into a multiple of prediction subblocks.

The output from the prediction decoding stage is the three components Y, Cb and Cr. However, it is possible to further improve the fidelity of these components, and this is done in the loop filtering stage. The loop filtering stage in VVC consists of three sub-stages; a deblocking filter sub-stage, a sample adaptive offset filter (SAO) sub-stage, and an adaptive loop filter (ALF) sub-stage. In the deblocking filter sub-stage, the decoder changes Y, Cb and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in a certain value range or in specific neighborhoods (e.g., in local maxima). In this disclosure, the reconstructed image component that are the result of this stage may be referred as YSAO, CbSAO, and CrSAO.

In VVC, the deblocking is applied on an 4×4 grid for CUs first on vertical boundaries (CU/implicit TU/prediction sub-block boundaries) and then on horizontal boundaries (CU/implicit TU/prediction sub-blocks). Prediction sub-block boundaries inside a CU is filtered on an 8×8 grid. The deblocking is based on HEVC deblocking but also have longer deblocking filters if the size orthogonal to the block boundary is equal to or larger than 32 on at least one side for luma and the other side is larger than 4, modifying at most 7 samples (reading at most 8 samples), if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples otherwise it modifies at most one sample and reading at most two samples on respective side of the boundary.

Neural networks (NN) have got increased usage lately due to developments in convolutional neural networks (CNN). In this disclosure, the terms "NN," "NN filter," "NN loop filter," "NN based filter," "NN-based in-loop filter" are interchangeably used. Also NN and machine learning (ML) are interchangeably used. In JVET NN has been used to replace deblocking and can achieve significant rate savings objectively, i.e., in terms of calculated BD rate (Bjontegaard delta rate which gives the rate savings at fixed PSNR). As an example, the JVET contribution JVET-X0140 proposes a NN-based in-loop filter. The NN-based in-loop filter selects between a small number of convolutional networks that are designed to filter the reconstructed samples. The NN-based in-loop filter use the information from the reconstructed samples, quantization parameter (QP), and block boundary strength (BS). Boundary strength here is basically same as bs used by deblocking in VVC but limited to two closest rows/columns for horizontal/vertical boundaries. It is also mapped such that a bs=1 is mapped to 512 and bs=2 is mapped to 1023. The deblocking filter in VVC is turned off in JVET-X0140. The difference between the output of the NN and the reconstructed samples is scaled by a weight and added back to the reconstructed samples. The following describes an example of how the output of NN is added back to the reconstructed samples:

One example NN use reconstructed samples and QP and BS as input, and generate new samples as output where the contribution of the NN is controlled by scaling a difference between the NN filtered sample and the reconstructed sample and add that to the reconstructed sample.

Usually, the encoder can choose from multiple NNs and selects the one that gives the best performance. In JVET-X0140, the NN is selected for each frame and the choice of the NN is signaled once per frame. The weight used to control the amount of modification of the reconstructed sample is determined for each frame and it is also signaled once per frame. Before signaling w they remove a constant and on the decoder side they add the constant to obtain w. The constant is set to 256 which in their implementation corresponds to w=1. The multiplication of w and the sample difference is performed by (diff*wF*16+512)>>12, where w=wF*16. This means that the encoder signals the difference between only using NN (w=1) and the determined use of NN.

Furthermore, the NN filtering can be selected on a block level (CTU basis) if NN filtering shall be used or not. This selection of using NN filtering or not is signaled per each block. Which NN model to use is not selected every CTU, since this switching of models is considered to be too expensive to implement in hardware.

After the NN filtering process, SAO filtering and ALF may be additionally applied.

In another example from JVET contribution JVET-X0066, the neural network does not only use the reconstructed samples, QP and bs but also makes use of the predicted samples.

SUMMARY

Certain challenges exist. Machine Learning (ML)-based filtering fails to perform sufficiently strong deblocking on a video frame, and thus the resulting frame may contain remaining blocking artifacts. Thus, if a separate deblocking process is not used in addition to the ML-based filtering, the video frame may suffer from blocking artifacts. Similarly, in case the ML-based filtering is not used for a particular Coding Tree Unit (CTU), the CTU will not be processed by any deblocking filtering process at all, not even the weaker deblocking the NN filter could give. Thus for that CTU, the blocking artifacts may be even stronger. Similarly, in the extreme case the ML-based filtering is not used for a particular frame, the frame will not be processed by any deblocking process thus blocking artifacts can appear in the whole frames. Even if SAO filtering and ALF are applied to samples outputted from the ML-based filter, the samples will continue to suffer from blocking artifacts since SAO and ALF are not well adapted to mitigate blocking artifacts.

Accordingly, in one aspect, there is provided a method. The method comprises obtaining an input video frame data associated with an input video frame and performing a deblocking filtering operation on one or more samples included in the input video frame, thereby generating one or more deblocked samples. The method further comprises performing a machine-learning (ML)-based filtering operation and/or adaptive loop filtering operation on one or more samples included in the input video frame, thereby generating one or more filtered samples, and using said one or more deblocked samples and/or said one or more filtered samples, producing encoded or decoded video frame data including an encoded or decoded video frame.

In another aspect, there is provided a computer program comprising instructions which when executed by processing circuitry cause the processing circuitry to perform the method described above In another aspect, there is provided an apparatus for encoding or decoding a video frame. The apparatus is configured to obtain an input video frame data associated with an input video frame and perform a deblocking filtering operation on one or more samples included in the input video frame, thereby generating one or more deblocked samples. The apparatus is further configured to perform a machine-learning (ML)-based filtering operation and/or adaptive loop filtering operation on one or more samples included in the input video frame, thereby generating one or more filtered samples, and using said one or more deblocked samples and/or said one or more filtered samples, produce encoded or decoded video frame data including an encoded or decoded video frame.

In another aspect, there is provided an apparatus. The apparatus may comprise a memory and processing circuitry coupled to the memory. The apparatus may be configured to perform the method of any one of the methods described above.

Some embodiments of this disclosure may improve the subject quality of a video frame by removing blocking artifacts that may not be removed by the ML-based filtering or other non-deblocking loop filtering. Also some embodiments of this disclosure may reduce bitrate as much as the amount of bitrate reduction achieved by ML-based filtering replacing the deblocking. Below bitrate reductions when enabling the invention together with ML-based filtering compared to ML-based filtering for three example sequences are shown for low-delay B configurations. On average for these three sequences a rate saving of 0.2% is achieved for luma (Y), 2.1% for chroma component U and 3.6% for chroma component V.

| | |
|---|---|
| FourPeople_1280 × 720_60: | BDR Y −0.57% U −2.73% V −4.50% |
| Johny_1280 × 720_60 | BDR Y 0.31% U −1.31% V −2.27% |
| KristenAndSara 1280 × 720_60 | BDR Y −0.35% U −2.28% V −4.08% |
| AVG: | BDR Y −0.20% U −2.11% V −3.61% |

In the table provided above, a negative BDR may indicate rate savings at same quality. Y is luma and U and V is chroma components.

BRIEF DESCRIPTION OF THE DRAWINGS

The accompanying drawings, which are incorporated herein and form part of the specification, illustrate various embodiments.

DETAILED DESCRIPTION

Figure 7:
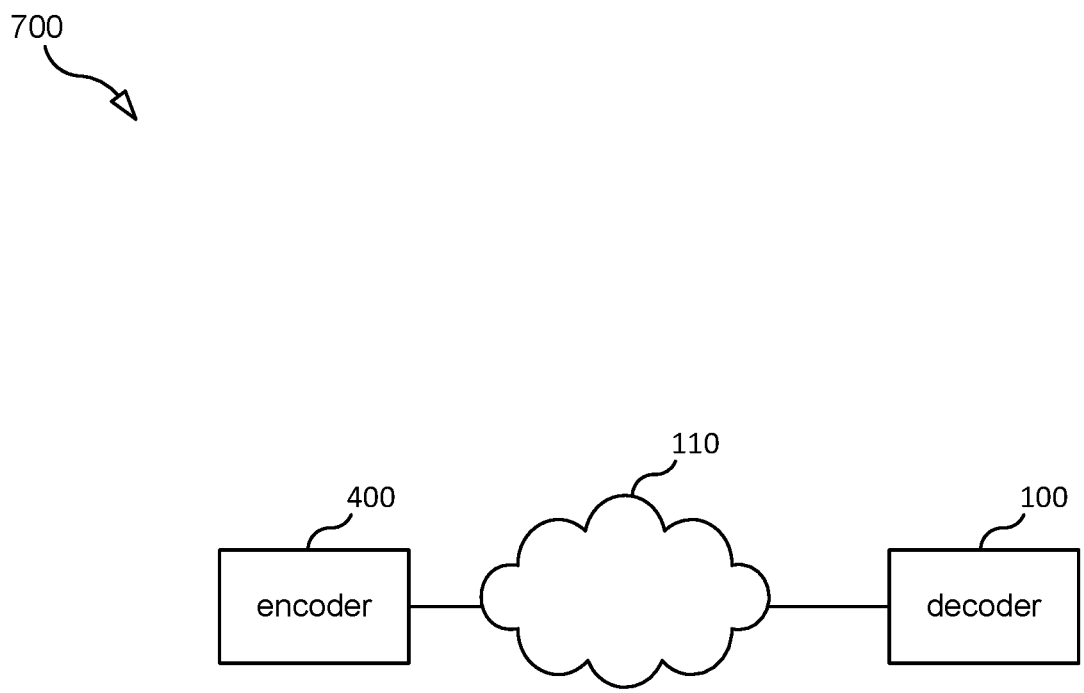
FIG. 7 shows a system according to some embodiments.

FIG. 7 illustrates a system 700 according to an example embodiment. System 700 may include a decoder 100 in communication with an encoder 400 via a network 110 (e.g., the Internet or other network). Encoder 400 may be configured to encode an original video data and send encoded video data (a.k.a., a bit stream) to decoder 100. Decoder 100 may be configured to decode the bit stream, thereby generating a reproduced video data.

Figure 1:
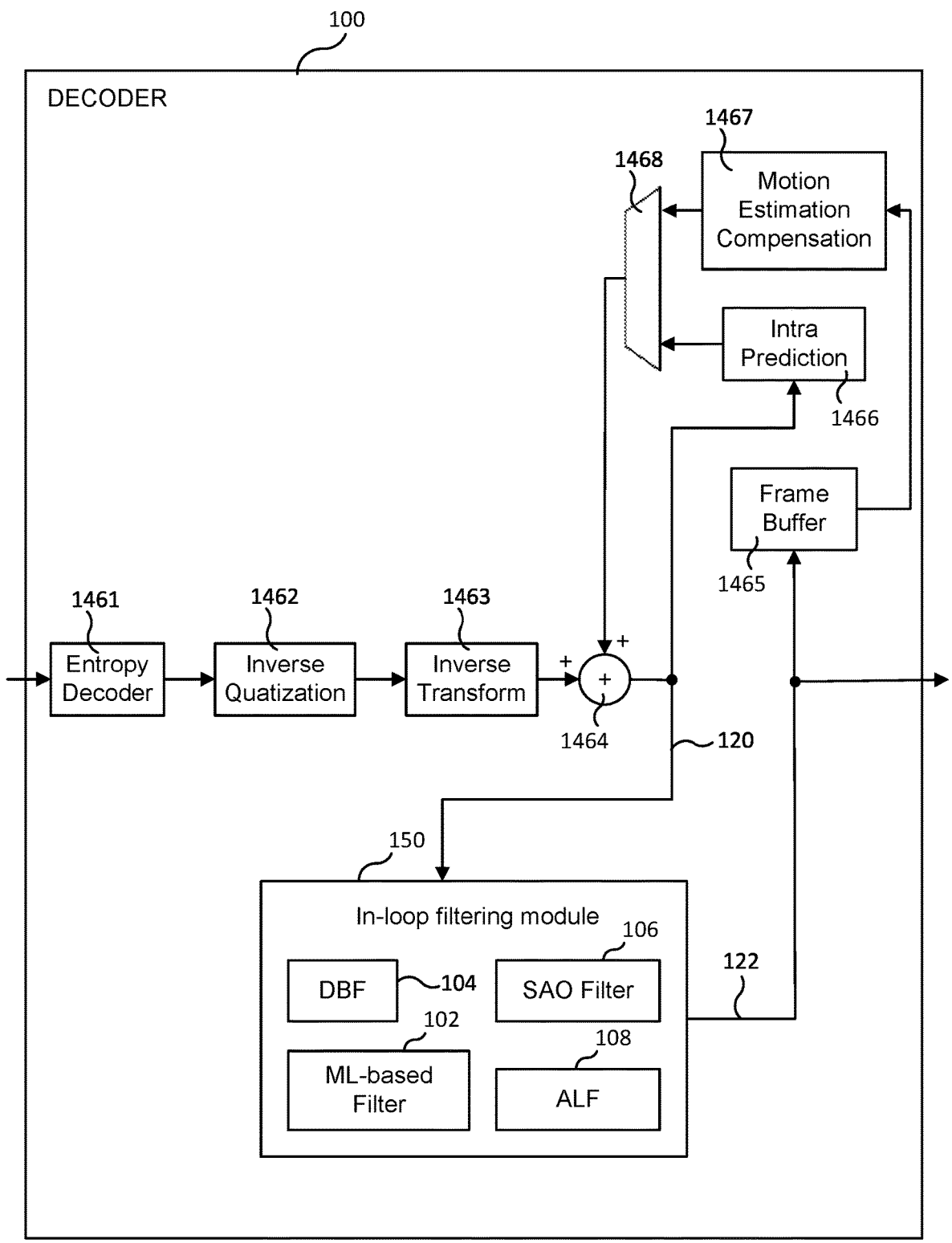
FIG. 1 shows a simplified diagram of a decoder.

FIG. 1 shows a simplified block diagram of decoder 100 according to some embodiments. Decoder 100 may comprise a decoding unit 1461, such as entropy decoder, for decoding an encoded representation of a block to get a set of quantized and transformed residual errors. These residual errors are dequantized in an inverse quantizer 1462 and inverse transformed by an inverse transformer 1463 to get a set of residual errors. These residual errors are added in an adder 1464 to the pixel values of a reference block. The reference block is determined by a motion estimator/compensator 1467 or intra predictor 1466, depending on whether inter or intra prediction is performed. A selector 1468 is thereby interconnected to the adder 1464 and the motion estimator/compensator 1467 and the intra predictor 1466. The resulting decoded block output 120 from the adder 1464 (a.k.a., "reconstructed data") is input to an in-loop filtering module 150. Based on the received reconstructed data 120, in-loop filtering module 150 may be configured to generate output data 122. Output data 122 may be temporarily provided to a frame buffer 1465 and can be used as a reference block for a subsequent block to be decoded. The frame buffer 1465 is thereby connected to the motion estimator/compensator 1467 to make the stored blocks of pixels available to the motion estimator/compensator 1467. The output from the adder 1464 is preferably also input to the intra predictor 1466 to be used as an unfiltered reference block.

As shown in FIG. 1, in-loop filtering module 150 may comprise a machine learning (ML)-based filter 102, a deblocking filter (DBF) 104, a sample adaptive offset (SAO) filter 106, and an adaptive loop filter (ALF) 108. The ML may be based on a neural network (NN).

The ML-based filter 102 may be configured to remove potential artifacts and reduce the error in the reconstructed samples. ML-based filter 102 may be configured to maintain and/or enhance texture in reconstructed samples by using a larger neighborhood surrounding the sample to be filtered. In some embodiment, the ML model (e.g., a neural network) that is used in the ML-based filter 102 may be trained to output video data as similar as possible to an original video data. In other words, in training the ML model, the input data for the training may be encoded video data that decoder 100 received from the encoder and the output data for the training may be the original video data.

SAO filter 106 may be provided to provide bitrate savings and subjective improvements. SAO filter 106 may be configured to modify values of samples included in a video frame according to spatial characteristics (e.g., vertical, horizontal or diagonal edges (edge offsets)) or for different ranges of sample values (band offset).

ALF 108 may be configured to provide significant Bjontegaard Delta Bitrate (BDR) rate savings. The filtering by ALF 108 may be applied after deblocking and sample adaptive offset. In ALF 108, coefficients may be optimized to reduce the error towards the source samples. The filter can be enabled on a CTU basis from a selection of filters which are dedicated for specific spatial characteristics which are determined by Laplacians.

DBF 104 may be configured to reduce differences between the values of samples included in two adjacent blocks included in a video frame by applying a filtering to the samples of the two adjacent blocks. The function of DBF 104 is further explained with respect to FIG. 2.

Figure 2:
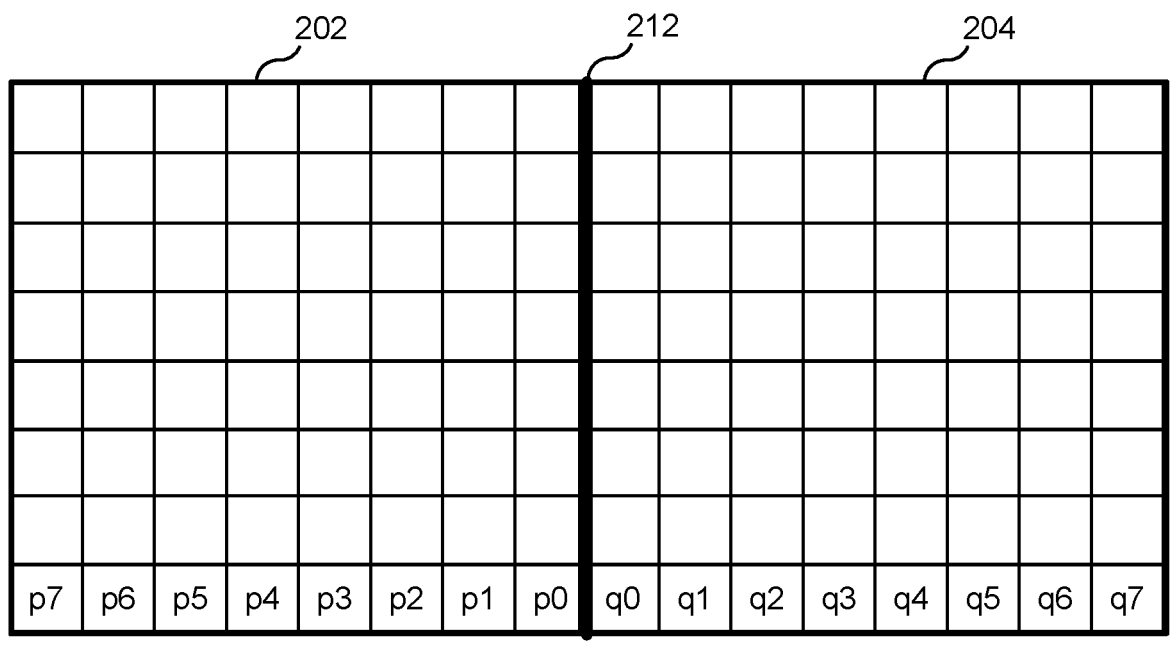
FIG. 2 shows an example of blocks included in a video frame.

FIG. 2 shows a first block 202 and a second block 204 that are included in a video frame. Each of first and second blocks 202 and 204 may be a coding tree unit (CTU). In FIG. 2, each of first and second blocks 202 and 204 comprises 64 samples. The particular number of samples included in each of first and second blocks 202 and 204 is provided for illustration purpose only and does not limit the embodiments of this disclosure in any way.

As shown in FIG. 2, there is a block boundary 212 between first block 202 and second block 204. Each of first and second blocks 202 and 204 may be a transformed and/or predicted (a.k.a, "reconstructed") block. For example, in decoder 100 shown in FIG. 1, first and second blocks 202 and 204 may be included in a video frame of video frame data 120 that is provided to in-loop filter module 150.

In FIG. 2, first block 202 includes 8 reconstructed samples (p0, p1, . . . , p7) on the left side of block boundary 212 and second block 204 includes 8 reconstructed samples (q0, q1, . . . , q7) on the right side of block boundary 212. In some scenarios, because of the differences between values of samples included in first block 202 and values of samples included in second block 204, discontinuities may appear at the boundary 212 between the two blocks. These discontinuities may lead to visual artifacts (a.k.a., blocking artifacts).

The DBF 104 may be configured to reduce such differences between the values of the samples included in first and second blocks 202 and 204. More specifically, DBF 104 may be configured to apply a different degree of filtering to the samples p0-p7 included in first block 202 and the samples q0-q7 included in second block 204 such that a stronger filter is applied to the samples that are closer to the boundary. Thus, in the samples shown in FIG. 2, the DBF 104's filtering applied to p0 is stronger than the DBF 104's filtering applied to p1. Similarly, the DBF 104's filtering applied to q0 is stronger than the DBF 104's filtering applied to q1.

Figure 3:
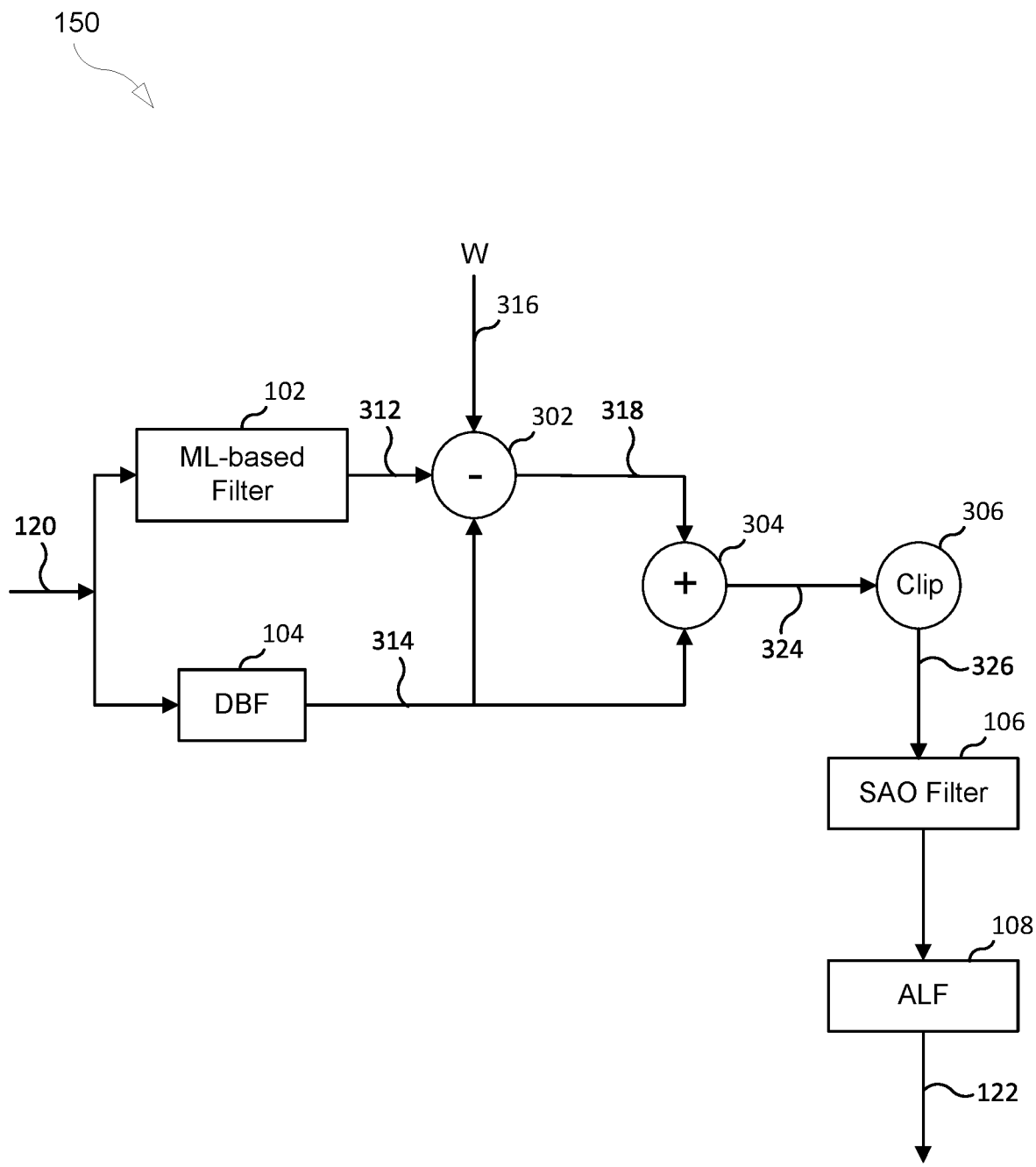
FIG. 3 shows an exemplary structure of in-loop filtering module according to some embodiments.

There are different ways of implementing the deblocking filtering in in-loop filtering module 150. FIG. 3 shows an example implementation of the deblocking filtering in in-loop filtering module 150 according to some embodiments.

As explained with respect to FIG. 1, reconstructed video data 120 may be provided to in-loop filtering module 150. More specifically, in the exemplary implementation shown in FIG. 3, reconstructed video data 120 may be provided to ML-based filter 102 and DBF 104.

ML-based filter 102 may be configured to remove potential artifacts and reduce the error in the reconstructed samples, thereby outputting ML-based filtered data 312. Also, as explained above, DBF 104 may be configured to perform a deblocking filtering on reconstructed video data 120, thereby outputting deblocked data 314.

ML-based filtered data 312 and deblocked data 314 are provided to a first arithmetic unit 302. First arithmetic unit 302 may be configured to perform a mathematical operation on ML-based filter data 312 and deblocked data 314. For example, first arithmetic unit 302 may be a subtractor that is configured to subtract the values of samples included in deblocking data 314 from the values of samples included in ML-based filter data 312, thereby obtaining a difference between ML-based filtered data 312 and deblocked data 314. First arithmetic unit 302 may be additionally configured to multiply the difference by a weight 316, thereby generating first output data 318. Thus, in one example, $Data_{318} = (Data_{312} - Data_{314}) \times Weight_{316}$.

Weight 316 may be a value between 0 and 1.25, and may vary based on a distance between a position of a current sample (i.e., the sample to which weight 316 is to be applied) and a boundary between the block including the current sample and another block that is adjacent to the block. For example, in FIG. 2, if the current sample is p2, weight 316 may be determined based on a distance between p2 and boundary 212. In one embodiment, weight 316 may become smaller as the distance between the current sample and the boundary decreases, thereby increasing the contribution of the deblocked sample to the output sample. In one embodiment to make sure that sufficient amount of deblocking is used, the weight can be set to be smaller than 1.

In other embodiments, weight 316 may be a set of weight values 320 and 322. In such case, $$Data_{318} = Data_{312} \times Weight_{320} - Data_{314} \times Weight_{322}.$$

Second arithmetic unit 304 may be configured to receive first output data 318 and deblocked data 314 and to perform a mathematic operation on first output data 318 and deblocked data 314. For example, second arithmetic unit 304 may be an adder adding the values of samples included in first output data 318 and the values of samples included in deblocked data 314, thereby outputting second output data 324. In other words, $Data_{324} = Data_{318} + Data_{314}$. Alternatively, when weight 316 is a set of weight values 320 and 322, $$Data_{324} = Data_{314} \times Weight_{322} + Data_{312} \times Weight_{320}.$$

Second output data 324 may be provided to a third arithmetic unit 306. In some embodiments, third arithmetic unit 306 may be configured to perform a clipping function, and outputs third output data 326. For example, third arithmetic unit 306 may be configured to compare a value of second output data 324 to a maximum threshold value and may adjust the value of second output data 324 to be the maximum threshold value if the value of second output data 324 is greater than or equal to the maximum threshold value and compare a value of second output data 324 to a minimum threshold value and may adjust the value of the second output data 324 to be the minimum threshold value if the value of the second output data 324 is smaller than the minimum threshold value. In some embodiments, the maximum threshold value may be determined based on a bit depth information (which indicates a bit depth) included in a bit stream that decoder 100 received from the encoder. For example, the maximum threshold may be $2^{bit\ dep} - 1$.

The bit-depth may be a bit depth that is used for encoding the video or the image decoder 100 received from the encoder. In other words, the video or image decoder 100 received from the encoder may be encoded at the bit-depth. For example, for 10-bit video, a range of allowed sample values would be between 0 and 1023, where the clipping function makes sure that the output value of the clipping function is in the range between 0 and $2^{bit\ depth} - 1$.

The in-loop filtering module 150 may be configured to generate output video data 122 based on third output data 326.

Using the above method, a video frame comprising samples which are both deblocked and enhanced by ML-based filtering may be obtained.

Even though FIGS. 1 and 3 show that ML-based filter 102 is separate from SAO filter 106 and/or ALF 108, in some embodiments, ML-based filter 102 may be used as SAO filter 106 and ALF 108. Alternatively, instead of ML-based filter 102, ALF 108 may be included in place of the ML-based filter 102.

In some embodiments, the above method may be performed by a decoder. In such case, the decoder may receive weight 316 from an encoder. For example, weight 316 may be included in a bit stream that the decoder receives from the encoder. In such case, according to some embodiments, the encoder may selectively determine whether to include weight 316 in the bit stream. For example, if the encoder determines or obtains information indicating that the decoder will not use the ML-based filtering for decoding the bit stream (i.e., will only use the deblocking filtering among the deblocking filtering and the ML-based filtering), the encoder may not include weight 316 in the bitstream to reduce or prevent signal overhead. In such scenario, decoder 100 do not need to decode any weight and can apply deblocking filtering for the whole picture.

Even though how the deblocking filtering is applied is explained with respect to decoder 100, the deblocking filtering can also be applied and/or implemented in an encoder.

Figure 4:
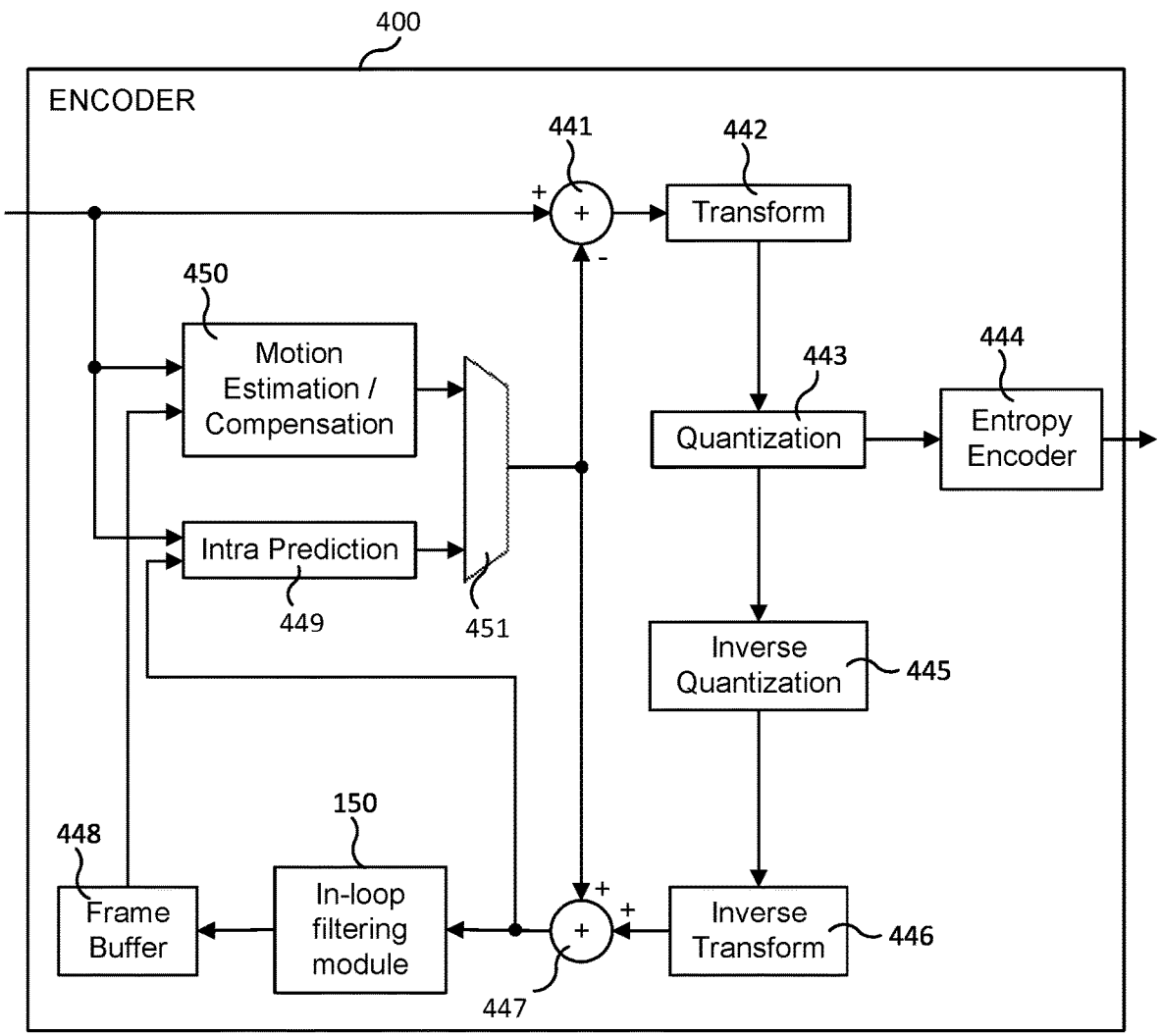
FIG. 4 shows a simplified diagram of an encoder.

FIG. 4 is a schematic block diagram of encoder 400 for encoding a block of pixel values (hereafter "block") in a video frame (picture) of a video sequence according to an embodiment. A current block is predicted by performing a motion estimation by a motion estimator 450 from an already provided block in the same frame or in a previous frame. The result of the motion estimation is a motion or displacement vector associated with the reference block, in the case of inter prediction. The motion vector is utilized by a motion compensator 450 for outputting an inter prediction of the block. An intra predictor 449 computes an intra prediction of the current block. The outputs from the motion estimator/compensator 450 and the intra predictor 449 are input in a selector 451 that either selects intra prediction or inter prediction for the current block. The output from the selector 451 is input to an error calculator in the form of an adder 441 that also receives the pixel values of the current block. The adder 441 calculates and outputs a residual error as the difference in pixel values between the block and its prediction. The error is transformed in a transformer 442, such as by a discrete cosine transform, and quantized by a quantizer 443 followed by coding in an encoder 444, such as by entropy encoder. In inter coding, also the estimated motion vector is brought to the encoder 444 for generating the coded representation of the current block. The transformed and quantized residual error for the current block is also provided to an inverse quantizer 445 and inverse transformer 446 to retrieve the original residual error. This error is added by an adder 447 to the block prediction output from the motion compensator 450 or the intra predictor 449 to create a reference block that can be used in the prediction and coding of a next block. This new reference block is first processed by in-loop filtering module 150 according to the embodiments in order to perform filtering to combat any blocking artifact. The processed new reference block is then temporarily stored in a frame buffer 448, where it is available to the intra predictor 449 and the motion estimator/compensator 450.

Figure 5:
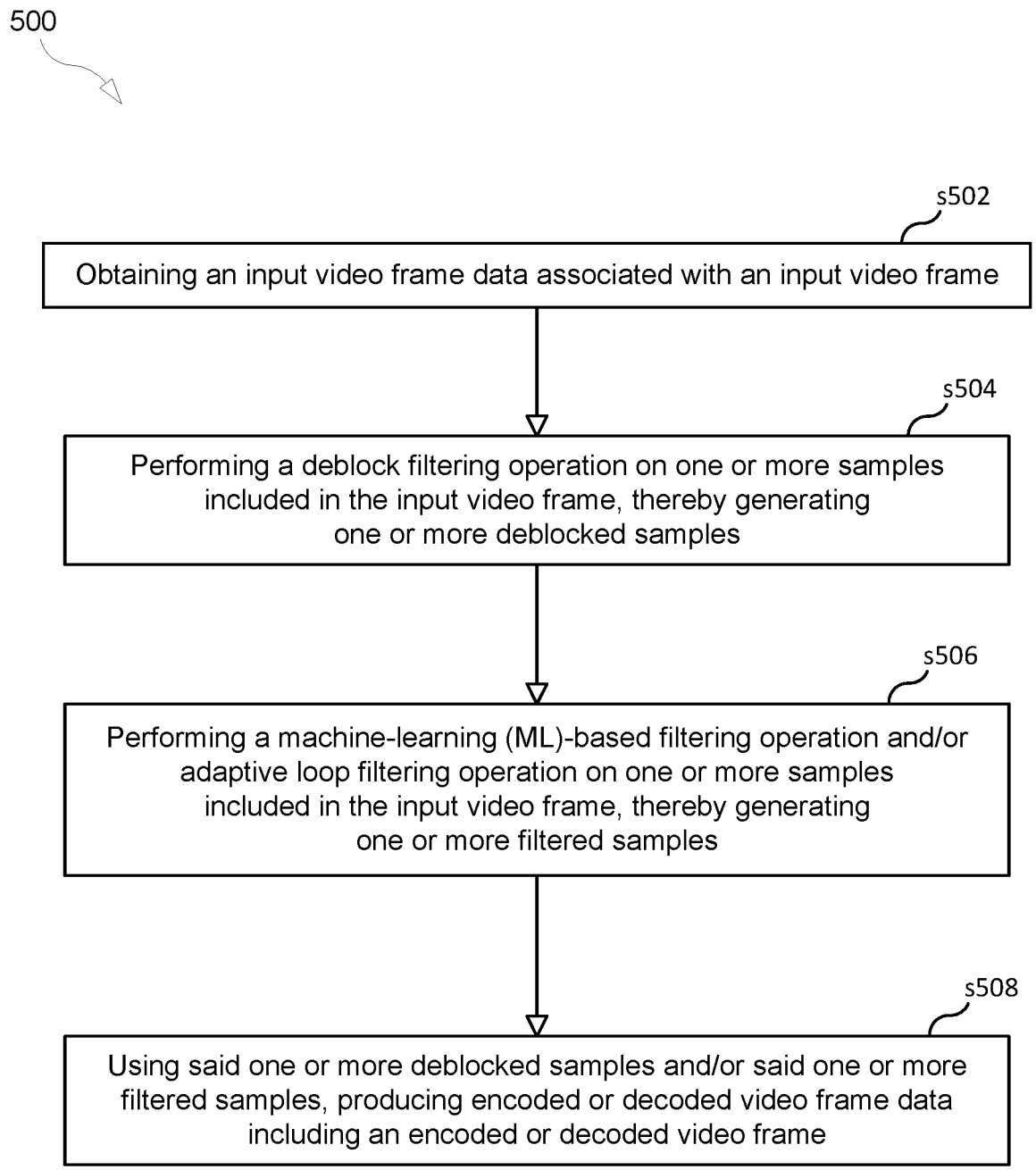
FIG. 5 shows a process according to some embodiments.

FIG. 5 shows a process 500 according to some embodiments. Process 500 may begin with step s502. Step s502 comprises obtaining an input video frame data associated with an input video frame. Step s504 comprises performing a deblocking filtering operation on one or more samples included in the input video frame, thereby generating one or more deblocked samples. Step s506 comprises performing a machine-learning (ML)-based filtering operation and/or adaptive loop filtering operation on one or more samples included in the input video frame, thereby generating one or more filtered samples. Step s508 comprises using said one or more deblocked samples and/or said one or more filtered samples, producing encoded or decoded video frame data including an encoded or decoded video frame.

In some embodiments, producing the encoded or decoded video frame data comprises calculating one or more weighted difference values between values of said one or more deblocked samples and values of one or more filtered samples.

In some embodiments, a value of one of said one or more deblocked samples is $p_{deblocked}$, a value of one of said one or more filtered samples is $p_{ML\text{-}based\ filtered}$, and producing the encoded or decoded video frame data comprises subtracting $p_{deblocked}$ from $p_{ML\text{-}based\ filtered}$, thereby obtaining a difference value, $p_{ML\text{-}based\ filtered} - p_{deblocked}$.

In some embodiments, producing the encoded or decoded video frame data comprises multiplying the difference value, $p_{ML\text{-}based\ filtered} - p_{deblocked}$, by a weight value (w), thereby generating a weighted difference value, $(p_{ML\text{-}based\ filtered} - p_{deblocked}) \times w$.

In some embodiments, producing the encoded or decoded video frame data further comprises adding the value of the one of said one or more deblocked samples, $p_{deblocked}$, to the weighted difference value, $(p_{ML\text{-}based\ filtered} - p_{deblocked}) \times w$, thereby generating a combined value.

In some embodiments, the one of said one or more deblocked samples corresponds to a sample in a first sample block of a reconstructed video frame, the first sample block is adjacent to a second sample block of the reconstructed video frame, the weight value is determined based on a distance between the one of said one or more deblocked samples and a boundary between the first sample block and the second sample block, each of the first sample block and the second sample block is either a transform block or a prediction block, and block boundary strength, BS, of the boundary is greater than a threshold value.

In some embodiments, the weight value becomes smaller as the distance becomes smaller.

In some embodiments, the weight value is a predetermined fixed value for samples that are deblocked.

In some embodiments, producing the encoded or decoded video frame data further comprises comparing the combined value to a maximum threshold value and changing the combined value to be the maximum threshold value if the combined value is greater than or equal to the maximum threshold value.

In some embodiments, the maximum threshold value is determined based on a bit depth value.

In some embodiments, the method is performed by a decoder that is configured to receive a bit stream from an encoder, and the bit stream that the decoder receives from the encoder is encoded at the bit depth value.

In some embodiments, said one or more deblocked samples are included in a first sample block that is vertically adjacent to a second sample block and that is horizontally adjacent to a third sample block, a vertical boundary is formed between the first sample block and the second sample block, a horizontal boundary is formed between the first sample block and the third sample block. The method further comprises applying deblocking of the vertical boundary when the width of the first sample block or the width of the second sample block is greater than or equal to a threshold value; and applying deblocking of the horizontal boundary when the height of the first sample block or the height of the third sample block is greater than or equal to a threshold value. Producing encoded or decoded video frame data is based on the comparison. One example threshold value is 32. Another example is to only apply the deblocking filter on samples that are within a threshold distance from one or more boundaries that are aligned with one or more boundaries of a CTU. More specifically, the deblocking filtering operation may be applied only on samples that are within a threshold distance from the boundaries of a CTU.

In some embodiments, the method is performed by an encoder or a decoder.

Figure 6:
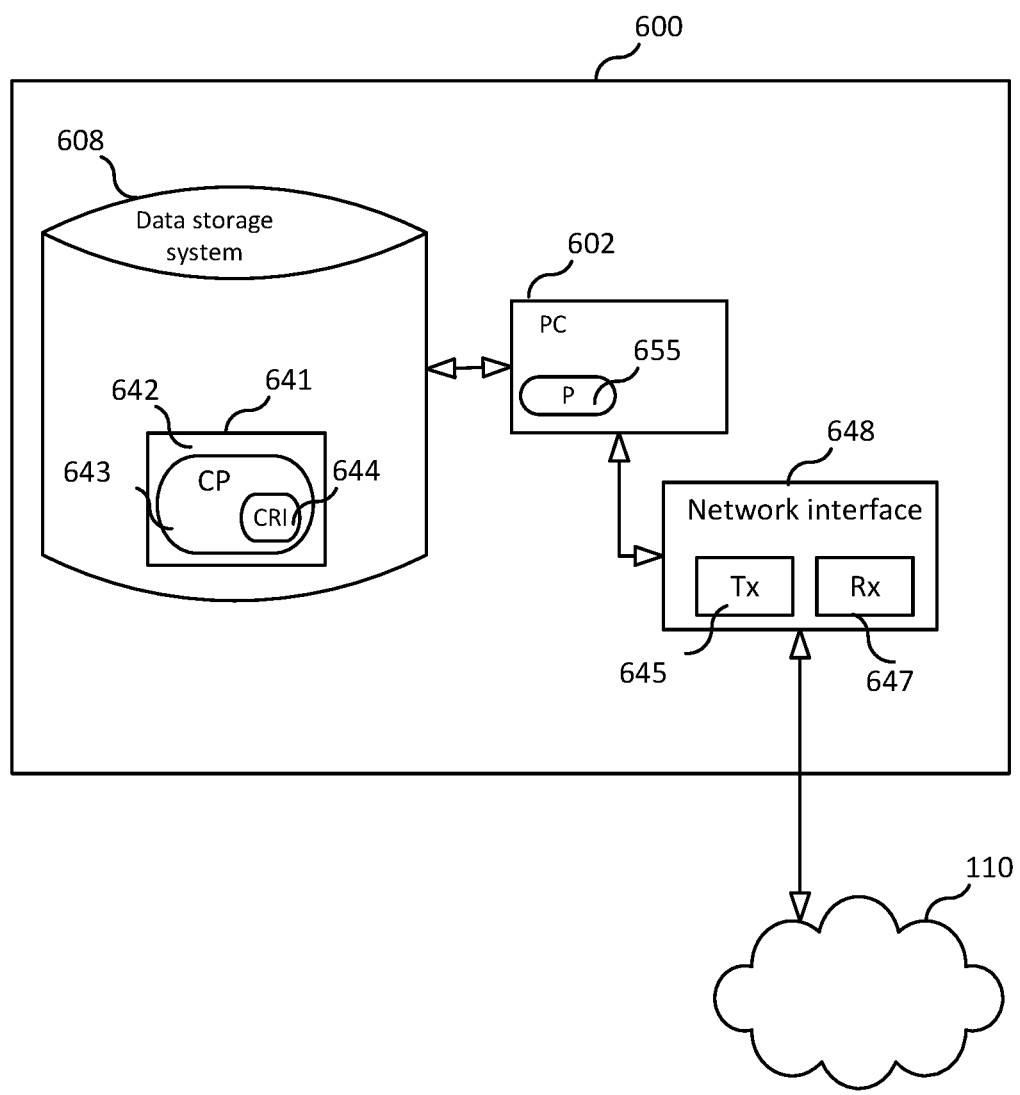
FIG. 6 shows an apparatus according to some embodiments.

FIG. 6 is a block diagram of an apparatus 600 for implementing decoder 100 and/or encoder 400, according to some embodiments. When apparatus 600 implements a decoder, apparatus 600 may be referred to as a "decoding apparatus 600," and when apparatus 600 implements an encoder, apparatus 600 may be referred to as an "encoding apparatus 600." As shown in FIG. 6, apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); at least one network interface 648 comprising a transmitter (Tx) 645 and a receiver (Rx) 647 for enabling apparatus 600 to transmit data to and receive data from other nodes connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, the method comprising:
obtaining an input video frame data associated with an input video frame;
performing a deblocking filtering operation on one or more samples included in the input video frame, thereby generating one or more deblocked samples;
performing a machine-learning (ML)-based filtering operation and/or adaptive loop filtering operation on one or more samples included in the input video frame, thereby generating one or more filtered samples; and
using said one or more deblocked samples and/or said one or more filtered samples, producing encoded or decoded video frame data including an encoded or decoded video frame, wherein producing the encoded or decoded video frame data comprises generating a combined value by adding the value of one of said one or more deblocked samples, $p_{deblocked}$, to a weighted difference value, $(p_{ML\text{-}based\ filtered} - p_{deblocked}) \times w$, wherein $p_{ML\text{-}based\ filtered}$ is a value of one of said one or more filtered samples and w is a weight value, wherein:
the one of said one or more deblocked samples corresponds to a sample in a first sample block of a reconstructed video frame,
the first sample block is adjacent to a second sample block of the reconstructed video frame,
the weight value is determined based on a distance between the one of said one or more deblocked samples and a boundary between the first sample block and the second sample block,
each of the first sample block and the second sample block is either a transform block or a prediction block, and
a block boundary strength, BS, of the boundary is greater than a threshold value.

2. The method of claim 1, wherein the weight value is a predetermined fixed value for samples that are deblocked.

3. The method of claim 2, wherein producing the encoded or decoded video frame data further comprises:
comparing the combined value to a maximum threshold value; and
changing the combined value to be the maximum threshold value if the combined value is greater than or equal to the maximum threshold value.

4. The method of claim 3, wherein the maximum threshold value is determined based on a bit depth value.

5. The method of claim 4, wherein
the method is performed by a decoder that is configured to receive a bit stream from an encoder, and
the bit stream that the decoder receives from the encoder is encoded at the bit depth value.

6. The method of claim 1, wherein
said one or more deblocked samples are included in a first sample block that is vertically adjacent to a second sample block and that is horizontally adjacent to a third sample block,
a vertical boundary is formed between the first sample block and the second sample block,
a horizontal boundary is formed between the first sample block and the third sample block,
the method comprising:
applying deblocking of the vertical boundary when the width of the first sample block or the width of the second sample block is greater than or equal to a threshold value; and
applying deblocking of the horizontal boundary when the height of the first sample block or the height of the third sample block is greater than or equal to a threshold value, and producing encoded or decoded video frame data is based on the comparison.

7. The method of claim 6, wherein the threshold value is 32.

8. The method of claim 1, wherein the deblocking filtering operation is applied to samples that are within a threshold distance from one or more boundaries that are aligned with a boundary of a coding tree unit, CTU.

9. The method of claim 1, wherein the method is performed by an encoder or a decoder.

10. A non-transitory computer readable storage medium storing a computer program, the computer program comprising computer program code, which, when run on processing circuitry of a device causes the device to perform a method comprising:
   obtaining an input video frame data associated with an input video frame;
   performing a deblocking filtering operation on one or more samples included in the input video frame, thereby generating one or more deblocked samples;
   performing a machine-learning (ML)-based filtering operation and/or adaptive loop filtering operation on one or more samples included in the input video frame, thereby generating one or more filtered samples; and
   using said one or more deblocked samples and/or said one or more filtered samples, producing encoded or decoded video frame data including an encoded or decoded video frame, wherein producing the encoded or decoded video frame data comprises generating a combined value by adding the value of one of said one or more deblocked samples, $p_{deblocked}$, to a weighted difference value, $(p_{ML\text{-}based\ filtered} - p_{deblocked}) \times w$, wherein $p_{ML\text{-}based\ filtered}$ is a value of one of said one or more filtered samples and w is a weight value, wherein:
   the one of said one or more deblocked samples corresponds to a sample in a first sample block of a reconstructed video frame,
   the first sample block is adjacent to a second sample block of the reconstructed video frame,
   the weight value is determined based on a distance between the one of said one or more deblocked samples and a boundary between the first sample block and the second sample block,
   each of the first sample block and the second sample block is either a transform block or a prediction block, and
   a block boundary strength, BS, of the boundary is greater than a threshold value.

11. An apparatus comprising:
   a memory; and
   processing circuitry coupled to the memory, wherein the apparatus is configured to:
   obtain an input video frame data associated with an input video frame;
   perform a deblocking filtering operation on one or more samples included in the input video frame, thereby generating one or more deblocked samples;
   perform a machine-learning (ML)-based filtering operation and/or adaptive loop filtering operation on one or more samples included in the input video frame, thereby generating one or more filtered samples; and
   using said one or more deblocked samples and/or said one or more filtered samples, produce encoded or decoded video frame data including an encoded or decoded video frame, wherein producing the encoded or decoded video frame data comprises generating a combined value by adding the value of one of said one or more deblocked samples, $p_{deblocked}$, to a weighted difference value, $(p_{ML\text{-}based\ filtered} - p_{deblocked}) \times w$, wherein $p_{ML\text{-}based\ filtered}$ is a value of one of said one or more filtered samples and w is a weight value, wherein:
   the one of said one or more deblocked samples corresponds to a sample in a first sample block of a reconstructed video frame,
   the first sample block is adjacent to a second sample block of the reconstructed video frame,
   the weight value is determined based on a distance between the one of said one or more deblocked samples and a boundary between the first sample block and the second sample block,
   each of the first sample block and the second sample block is either a transform block or a prediction block, and
   a block boundary strength, BS, of the boundary is greater than a threshold value.

12. The apparatus of claim 11, wherein the weight value is a predetermined fixed value for samples that are deblocked.

13. The apparatus of claim 12, wherein producing the encoded or decoded video frame data further comprises:
   comparing the combined value to a maximum threshold value; and
   changing the combined value to be the maximum threshold value if the combined value is greater than or equal to the maximum threshold value.

14. The apparatus of claim 13, wherein the maximum threshold value is determined based on a bit depth value.

15. The apparatus of claim 14, wherein
   the apparatus is a decoder that is configured to receive a bit stream from an encoder, and
   the bit stream that the decoder receives from the encoder is encoded at the bit depth value.

16. The apparatus of claim 11, wherein
   said one or more deblocked samples are included in a first sample block that is vertically adjacent to a second sample block and that is horizontally adjacent to a third sample block,
   a vertical boundary is formed between the first sample block and the second sample block,
   a horizontal boundary is formed between the first sample block and the third sample block,
   the apparatus is configured to:
   apply deblocking of the vertical boundary when the width of the first sample block or the width of the second sample block is greater than or equal to a threshold value; and
   apply deblocking of the horizontal boundary when the height of the first sample block or the height of the third sample block is greater than or equal to a threshold value, and
   producing encoded or decoded video frame data is based on the comparison.

17. The apparatus of claim 16, wherein the threshold value is 32.

18. The apparatus of claim 11, wherein the deblocking filtering operation is applied to samples that are within a threshold distance from one or more boundaries that are aligned with a boundary of a coding tree unit, CTU.

19. The apparatus of claim 11, wherein the apparatus is an encoder or a decoder.

* * * * *